April 23, 1946.   H. J. NACHOD   2,398,952
APPARATUS FOR MANUFACTURING SILICA GLASS
Filed Dec. 22, 1941

HENRY J. NACHOD
INVENTOR.

BY Armand E. Muller

ATTORNEY.

Patented Apr. 23, 1946

2,398,952

UNITED STATES PATENT OFFICE 2,398,952

APPARATUS FOR MANUFACTURING SILICA GLASS

Henry J. Nachod, East Orange, N. J.

Application December 22, 1941, Serial No. 423,945

1 Claim. (Cl. 49—53)

This application is a continuation in part of applicant's copending application, Ser. No. 335,701, filed May 17, 1940.

This invention relates to a new and improved apparatus for the manufacture of silica-glass and the production of shaped articles of vitreous silica from sand.

The methods hitherto employed in the manufacture of articles of substantially pure silica-glass from silicium dioxide have various well-known disadvantages: (1) the raw material used in order to produce high grade transparent bubble-free silica ware, is clear quartz crystal which is fused in a vacuum. The raw material, as well as this process, is, very expensive; (2) only relatively small articles can be produced because it is nearly impossible to maintain uniformly in a large body the high temperature of about 2000° C. which is necessary for melting quartz.

The main object of this invention is to provide a new and improved apparatus for the production of clear and bubble-free glass articles of any dimensions from silicium dioxide by means of a continuously operating melting process, preferably an electric melting process.

Another object of this invention is to manufacture such articles from ordinary sand, without the admixture of additional vitrifying substances which may cause a lowering of melting temperatures, so-called fluxes, as for instance lime and boric acid.

Another object of this invention is to simplify the melting process of the silica glass as compared with the procedure employed in ordinary glass making, by eliminating several working steps, particularly the refining.

The above and other objects may be realized by providing three main physical conditions essential for the manufacture of vitrified articles according to this invention:

(a) The inclusion of air, gas or moisture in the molten mass during the melting process is to be prevented;

(b) The caloric energy imparted to the sand particles must be big enough to heat the single granules immediately to the melting point whereby water-vapor and gas on the surface and included air are instantly released, thus preventing the formation of bubbles in the molten mass.

(c) Evaporation of silica from the molten mass will be held at a minimum because a perfect control and regulation of the working temperature is possible in the process according to this invention.

According to the invention a pool or mass of molten refractory material is maintained in the apparatus in which the new process is performed by replenishing sand in the form of particles to heating means adapted to convert by internal heating into a molten pool of quartz the sand on top or around said heating means. New particles or granules of sand fed to the surface of the pool of quartz are melted immediately, so as to prevent the formation of bubbles in the mass. The heating elements may be resistance heating elements of suitable refractory material, permitting to adjust the working temperature in order to prevent overheating and evaporation of silica. The solid replenishing material is fed continuously or intermittently from a container located on top of the chamber in which the heating means are located, into said heating and melting chamber. The molten material is continuously or intermittently withdrawn from the pool of molten material into a cooling chamber situated under the melting chamber, where it is shaped and solidified simultaneously into sheets or tubes or bodies of various shapes. The rate of continuous feed of the replenishing material to the pool corresponds to the rate at which molten material is withdrawn continuously.

The nature of this invention will be fully understood from the following description and the accompanying drawing which illustrates, as an example only, one embodiment of an apparatus for the manufacture of silica glass sheets.

Figures 1, 2:
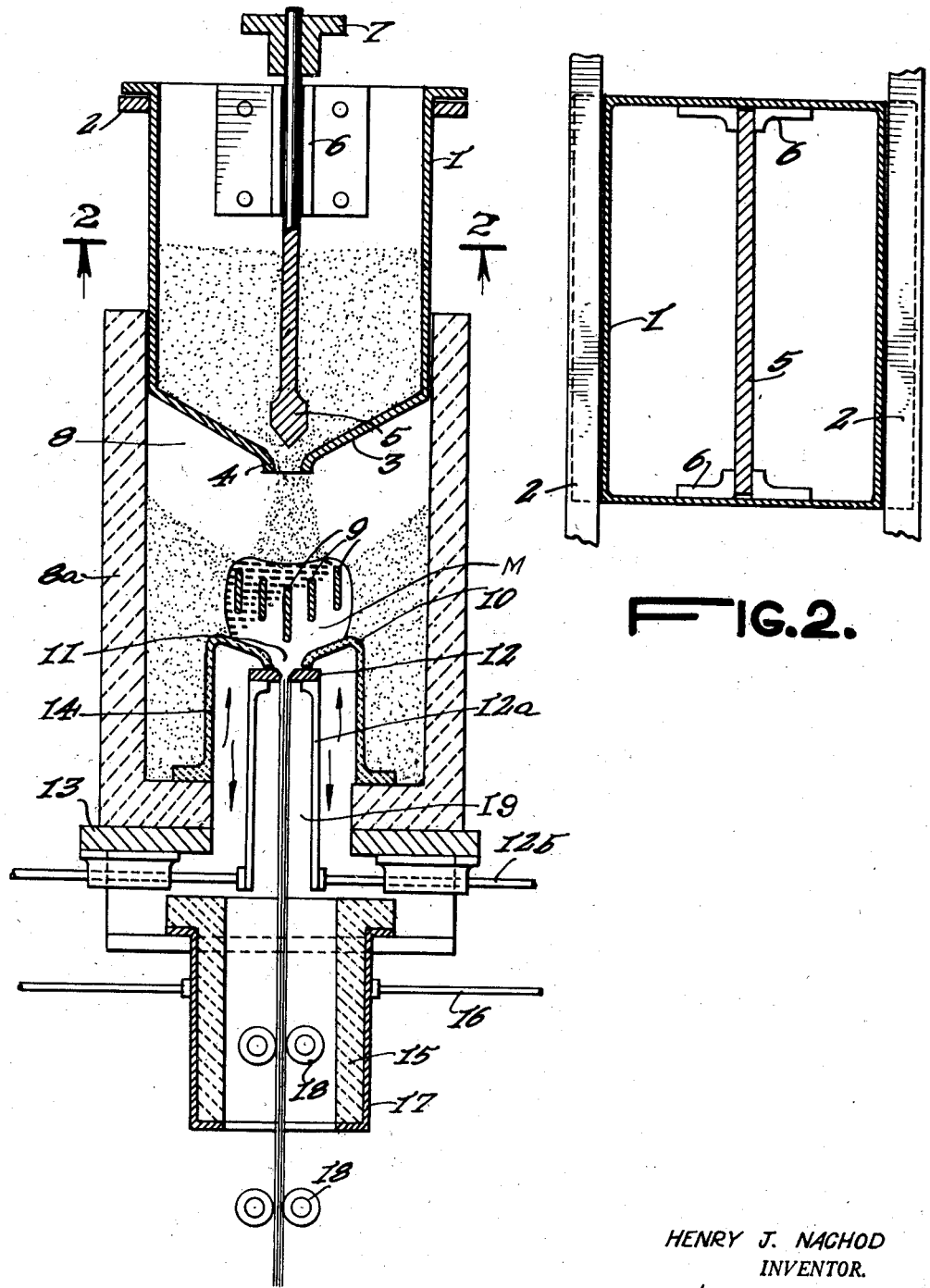
Fig. 1 is a diagrammatic vertical sectional view of an apparatus which can be used according to this invention.
Fig. 2 is a sectional view on the line 2—2 of Fig. 1.

As shown in Fig. 1, the raw material, ordinary sand without any admixture of additional vitrifying substances, is placed in a container 1 mounted in a frame 2. The bottom 3 of container 1 is provided with an outlet slot 4 at its lowest part. To regulate the amount of sand, passing the outlet slot 4, a valve member 5 is adjustably mounted above said outlet, comprising guide means 6, arranged at opposite walls of container 1, and a suitably supported locking member 7. The single particles of sand fall directly from outlet 4 into a chamber 8, the walls 8a of which consist of any suitable refractory material. The bottom 3 of container 1 forms the ceiling of chamber 8. The heating device 9 is arranged in chamber 8 at a suitable distance below the outlet slot 4 and symmetrically to it. The heating device 9, preferably electric, is suitably formed as a refractory body of longish shape of approximately the length of the outlet slot 4 and may have any cross section adapted to the desired large heating surface. It is made of a refractory material, e. g. iridium, tantalum, tungsten, or preferably molybdenum. The heating device comprises several heating plates of different length said plates being arranged vertically, parallel to each other. At a relatively small distance below the heating elements 9, an intermediate bottom 10 is provided. This bottom 10 forms a support for the molten mass of silica glass and it is, therefore, made of a suitable refractory material, preferably the same material as the heating device. An outlet slot 11 is provided in the middle of bottom 10 through which the molten silica glass can be removed continuously. Laterally shiftable slide plates 12 are arranged beneath the edges of slot 11 for regulating the amount of the mass to be removed. The slide plates 12 can be moved and mutually adjusted from the outside of the furnace chamber 8 by means of arms 12a and rods 12b. The intermediate bottom 10 is fixed to bottom 13 of furnace chamber 2, for instance by side walls 14. The space between the side walls 14 and below the intermediate bottom 10 forms the upper part of a cooling chamber for the band or strip of molten silica glass, flowing continuously in downward direction through the suitably adjusted slot 11. The lower part of this cooling chamber is formed by two vertical walls 15 made of refractory material, e. g., ceramic material, and symmetrically and adjustably arranged to the vertical middle plane of the slot 11. By adjusting these walls to each other, the cooling temperature can be regulated. The molten silica glass entering this cooling chamber solidifies progressively and forms according to the straight edges of the slot 11, or, of the side plates 12 respectively, a continuous planar silica glass sheet. For adjusting the walls 15, rods 16, for instance, may be provided being suitably connected with the metal frames 17 supporting the walls 15.

For regulating the speed with which the silica glass sheet is fed one or several sets of rolls 18 are arranged inside, or below, or inside and below, the cooling chamber, so as to work on the surface of the sheet. These rolls 18 may be positively driven by a suitable motor or may be actuated as idler rolls by the weight of the sheet itself. Before the continuous process of delivering the raw material, melting it, removing it, and forming it to a planar glass sheet begins, the necessary physical and technical conditions in the apparatus must be assured. For this purpose the apparatus has to be started suitably. The slide plates 12 are adjusted to close the outlet slot 11 for the molten mass, while the valve member 5 is adjusted to open the outlet slot 4 as long as a layer of sand of a suitable height is formed in the furnace chamber 8. After closing the outlet slot 4, the heating elements 9 are heated to a temperature of about 2000° C. The particles in the proximity of the heating members 9 are thus melted, forming a relatively small pool M of molten mass above the intermediate bottom 10 and around the heating elements. This pool M preferably is during the melting process surrounded at its sides by the unmelted sand particles fed to the furnace chamber during the starting period. This unmelted layer of sand, partially sintered together by the heat of the elements 9, forms a solid heat-insulating means between the pool of molten mass and the walls of the furnace chamber. It is advantageous to hold the molten mass M of silica glass, initially formed, for a certain period of time under the influence of the heated elements 9 to assure that all bubbles of vapor, gas or air have escaped.

Now by adjusting the outlets 4 and 11 in such a way that the mass of sand, fed to the furnace chamber during the time unit, approximately equals the mass of molten silica glass, removed from the furnace chamber during the same period, the continuous process of melting the sand into silica glass and of forming the removed silica glass into the desired product is started.

It is of importance that any heat radiating upward from the molten pool of glass, or the heating elements respectively, is used for pre-heating the jet of sand delivered from the outlet slot 4 as well as the mass of sand stored in container 1. By this pre-heating, the structure of the ordinary sand is advantageously changed from alpha-quartz to beta quartz or possibly gamma-quartz, before it is dropped upon the molten mass.

The inventor's apparatus is not limited to the continuous production of vitrified sheets, but can also be used for the continuous production of various other vitrified bodies, for instance cylinders, tubes and so on.

What I claim is:

An apparatus for the manufacture of vitrified quartz bodies from sand, comprising a sand container having a funnel shaped bottom provided at its lowest part with an outlet with means to regulate the delivery of the sand; a melting chamber arranged below said container with heating means provided under the bottom opening of the sand container near to the bottom of the melting chamber, said means being adapted to convert by internal heating the sand surrounding the same into a pool of molten quartz, the melting chamber being provided with a bottom having an insert with a suitable opening with adjustable valve members; said insert forming the top of a cooling chamber in which the molten quartz is withdrawn by proper means at a rate corresponding to the rate of the delivery of the sand to the melting chamber.

HENRY J. NACHOD.